Patented Feb. 12, 1929.

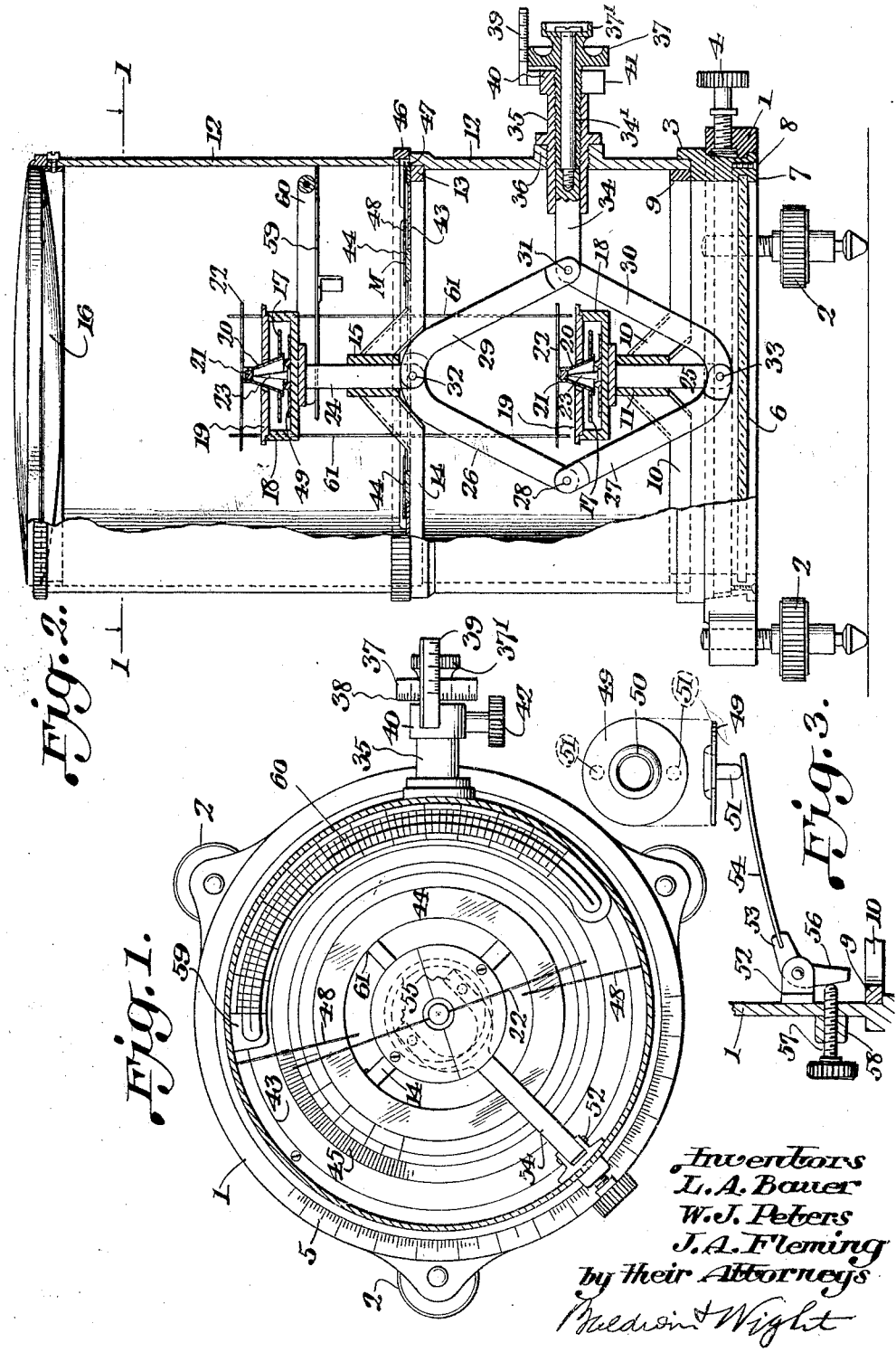

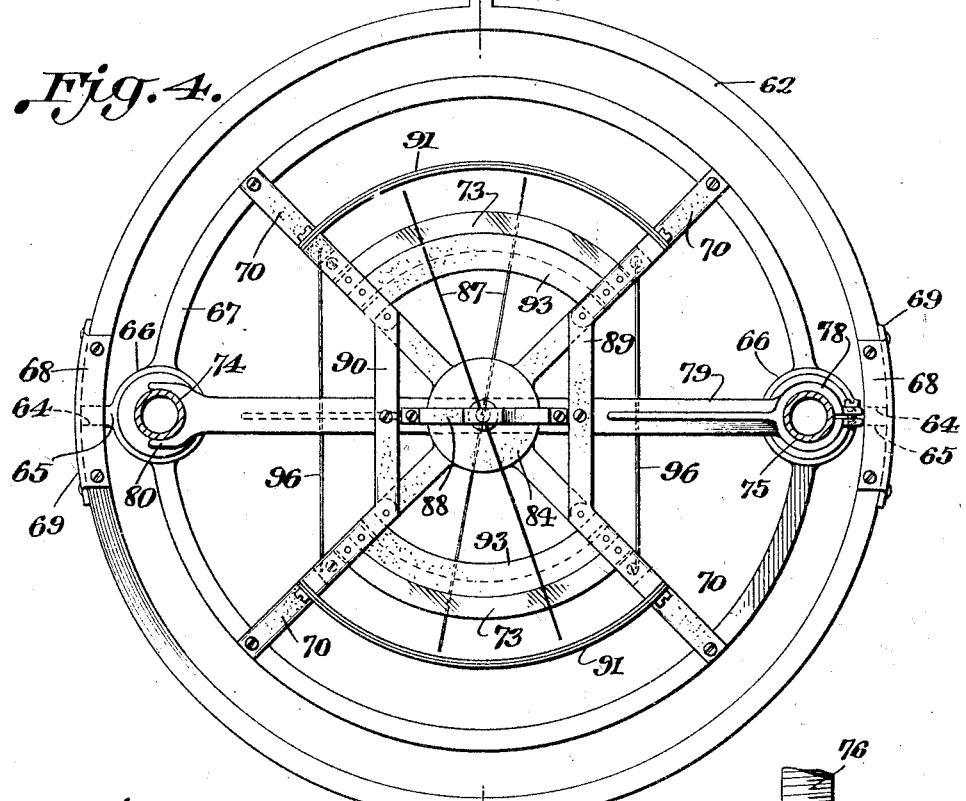
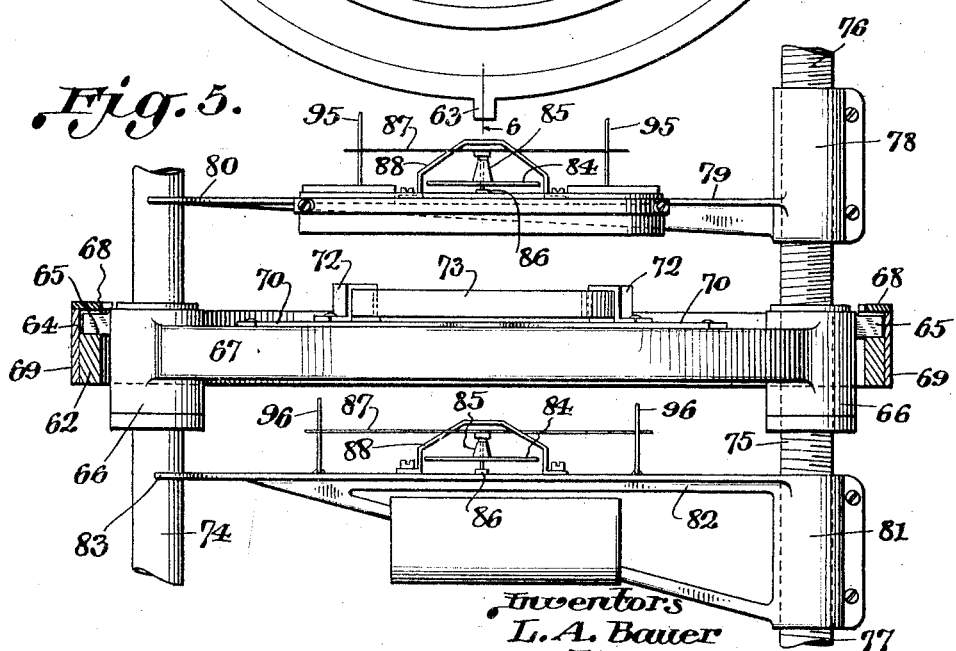

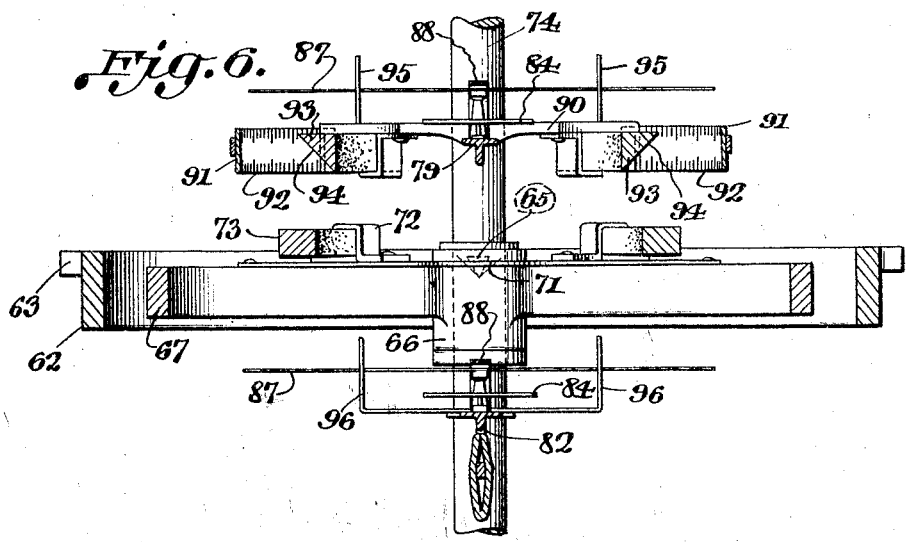
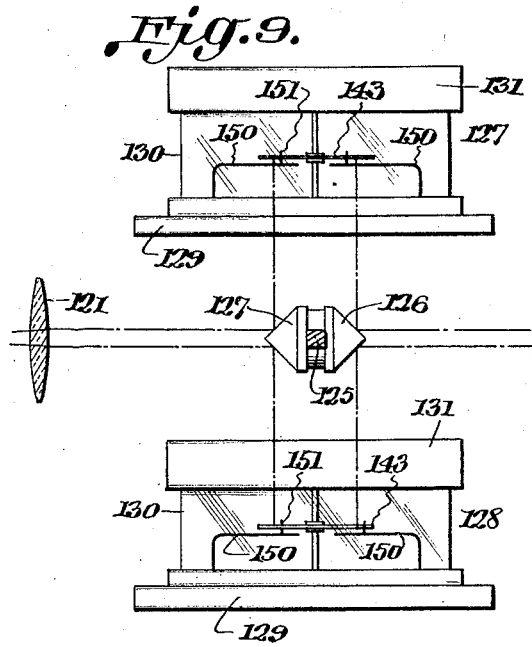
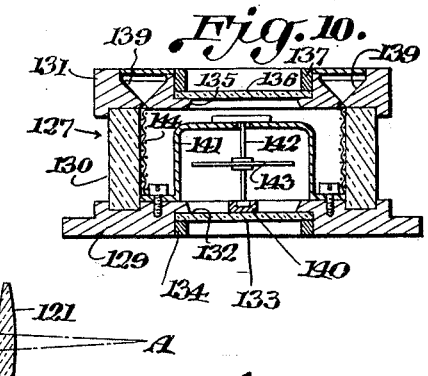
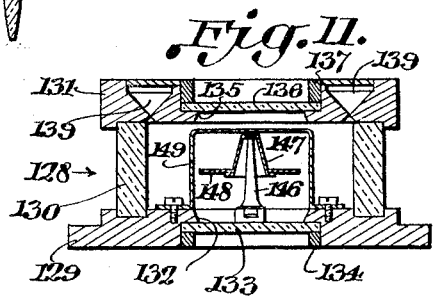

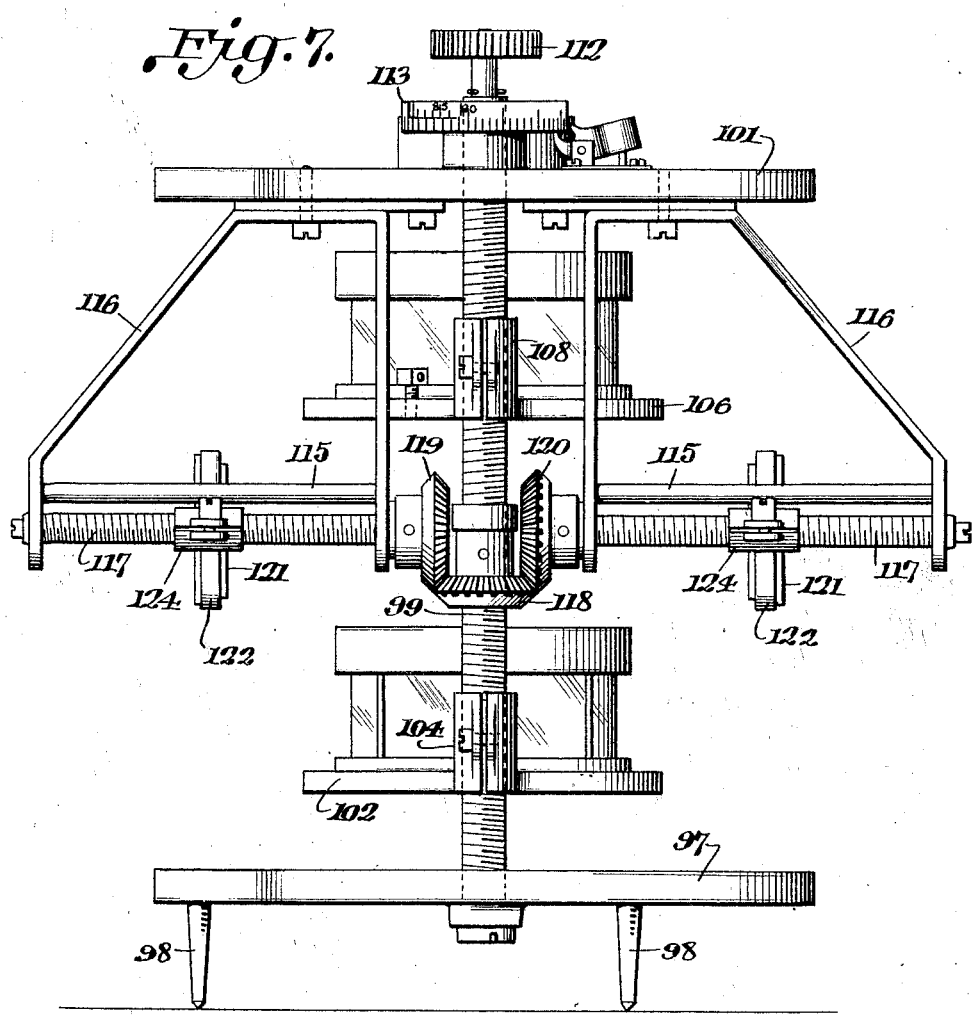

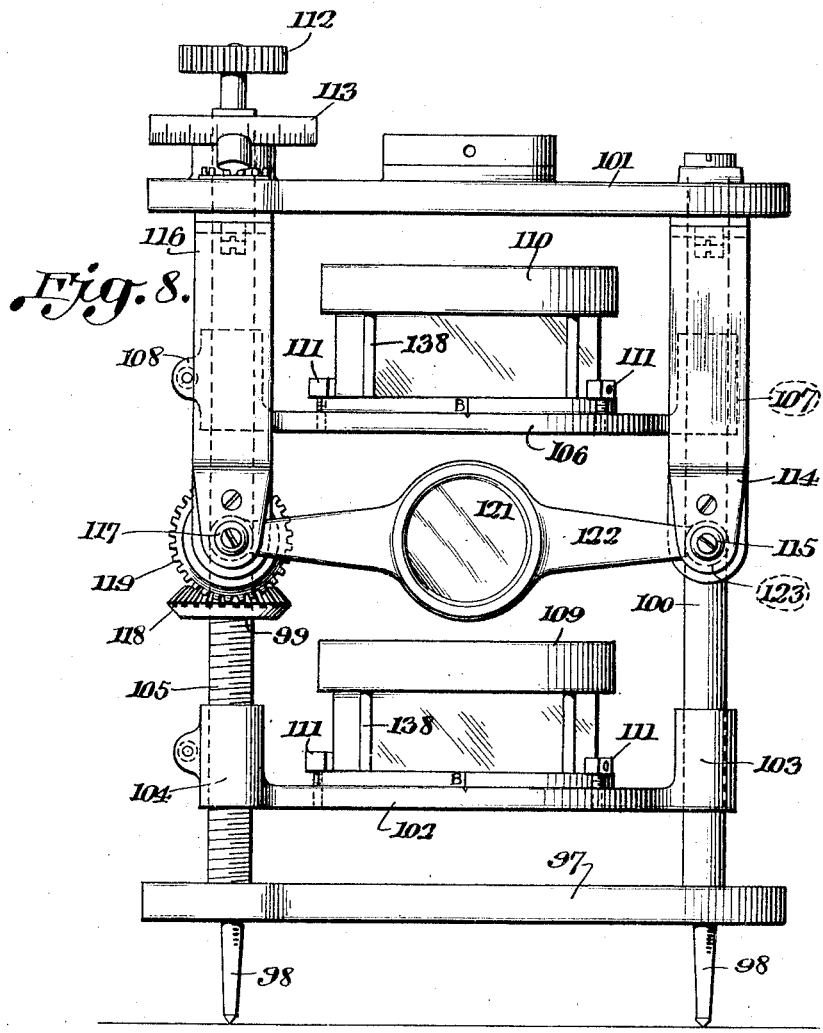

1,701,603

UNITED STATES PATENT OFFICE.

LOUIS A. BAUER, OF WASHINGTON, DISTRICT OF COLUMBIA, AND WILLIAM J. PETERS AND JOHN A. FLEMING, OF CHEVY CHASE, MARYLAND, ASSIGNORS TO CARNEGIE INSTITUTION OF WASHINGTON, OF WASHINGTON, DISTRICT OF COLUMBIA.

COMPASS VARIOMETER.

Application filed June 28, 1926. Serial No. 119,095.

This invention relates to a compass-variometer which is used primarily for the detection and measurement of slight changes in the earth's magnetism. It can be employed for rapid surveys of high precision and in investigations of magnetically disturbed regions such as magnetic fields in buildings, magnetic fields about iron ships, and regions of local disturbance in the earth's magnetic field. It may also be employed if desired for observing changes in magnetic declination.

The fundamental principle of the compass-variometer may be described briefly as follows:

Two magnets of equal or unequal magnetic moment are suspended independently one above the other and are so mounted that the distance between them may be varied in order to maintain a fixed horizontal deflection angle for any particular intensity of field, even though it may not be known.

There are herein disclosed three forms of compass-variometer, all of which embody the fundamental principle stated and which in many respects are quite similar, while differing in certain features and in their particular physical construction. Further details of the invention will be apparent from the following description and the whole will be covered by the appended claims.

In the drawings:

Figure 1 is a section taken on the line 1—1, of Figure 2, looking in the direction of the arrows.

Figure 2 is a vertical section through one form of the invention with parts in elevation.

Figure 3 is a view showing a detail of construction.

Figure 4 is a top plan view with parts in section of another embodiment of the invention.

Figure 5 is a side elevation of the structure shown in Figure 4.

Figure 6 is a section on the line 6—6 of Figure 4, looking in the direction of the arrows.

Figure 7 is a side elevation of a third embodiment of the invention.

Figure 8 is a side elevation of the same taken at right angles to Figure 7.

Figure 9 is a more or less diagrammatic view showing the optical system of the construction shown in Figures 7 and 8.

Figure 10 is a vertical section through one form of cell and illustrating one form of suspension of the magnetic disk.

Figure 11 is a similar section through a slightly different form of cell and showing a different form of suspension of the magnetic disk.

Referring to the form of invention illustrated in Figures 1, 2 and 3, this embodies a supporting ring 1 which is carried by a plurality of foot screws 2 which can be adjusted in the usual manner for leveling the device. Mounted for rotation within the support 1 is a base 3 which may be clamped in any desired position by means of the clamping screw 4. The upper surface of the support 1 is provided with a scale 5 and the base 3 is provided with an index mark which can be brought to register with any desired gradation of the scale 5. The bottom of the base member 3 is preferably closed by a ground glass 6 held in position by a ring 7 fastened to the base by screws 8. This protects the bottom of the case and also furnishes the desired illumination.

A ring 9 rests upon the top of the base 3 inside of the casing and is provided with a plurality of spider arms 10 which carry a bearing sleeve 11 at approximately the central axis of the device. The ring 9 is fastened to the lower end of a horizontal casing 12 which rests upon the base 3. Approximately midway between top and bottom of the casing is a second ring 13 supported on a shoulder of the casing 12 and having spider arms 14 supporting a bearing sleeve 15 in vertical alignment with the sleeve 11. The top of the casing may be closed by a reading lens 16 held in position by a bayonet joint or otherwise as desired.

Each of the two magnets are alike and a description of one will serve for the other. Each magnet 17 is preferably formed of a disk of thin steel which may be 22.5 mm. in diameter and 0.3 mm. in thickness, and copper-plated to protect against deterioration. In this embodiment of the invention each magnet 17 is supported within a copper damping box 18 having a cover 19 provided with a central opening. Each magnet is supported by a cone shaped member 20 having its small end upward and having a jewel 21 set in said upper end. To the top of this cone shaped member is attached a quartz pointer 22 which will indicate the magnetic axis of the disk or any desired angle thereto. The magnet 17 and the cone shaped member 20 are supported by means of a pin 23 carried by the base of the box 18 and having a needle point upon which rests the jewel 21. The magnet is therefore supported for free oscillation on a substantially frictionless bearing.

A rod 24 is attached to the bottom of the upper box 18 and is slidably mounted in the bearing sleeve 15. A similar rod 25 is attached to the underside of the lower box 18 and is similarly mounted for sliding movement in the bearing sleeve 11. A toggle lever has an upper arm 26 and a lower arm 27 which are pivoted together at 28 and a second similar toggle lever has an upper arm 29 and a lower arm 30 pivoted together at 31. The upper arms 26 and 29 of the two toggle levers are both pivoted to the rod 24 at 32. The lower arms 29 and 30 are similarly pivoted at 33 to the rod 25. It is obvious that by movement of the toggle levers the relative position of the magnets may be changed as desired.

The movement of these levers is obtained as follows: The rod 34 is pivoted to the levers 29 and 30 by the pivot 31 and this is slidably mounted and connected to a member 34' which is screw threaded in a bushing 35 mounted in a boss 36 of the casing 12. This member may be turned by means of a finger wheel 37' and will of course move the rod 34 in or out according to the direction of rotation. This movement will open or close the two pair of toggle levers and move the magnets to or from each other. The amount of movement is measured by micrometer mechanism comprising a wheel 37 connected to the member 34' and having a scale 38 which coacts with a scale 39 carried by a split sleeve 40 on said bushing 35. The use of this micrometer mechanism is obvious to any one skilled in the art. Whenever it is desired to hold the magnets in any adjusted position this may be done by means of a screw 42 which clamps together the separate jaws 41 of the member 40 and prevents rotation of the adjusting member 34'.

Approximately half way between the pointers 22 of the two magnets is a glass plate 43 resting on the spider arms 14 and having a central opening. A mirror 44 which is annular in form surrounds such central opening and outside the mirror a scale 45 is photographed upon the glass plate. A milled ring 46 surrounds the outside of the casing and has a connection to said glass plate extending through an arc shaped slot of approximately 90°, whereby rotation of said ring will rotate one or more quartz indices 48 mounted on the movable index ring 43 just described.

Resting on the bottom of each casing 18 is a plate 49 having a central opening 50 through which passes the supporting pin 23. This plate also has two projections 51 extending downwardly through openings in the bottom of the case 18. Between ears 52 carried by the inside of the casing 1 is pivoted the lever 53, one end of which has a flexible extension 54 terminating in a fork 55 (Fig. 1) the arms of which underlie the pins or projections 51. The screw 57 having a head for manual adjustment, is screw threaded in a boss 58 on the outside of the casing and extends through the casing so that the inner end of the same bears against the lower end 56 of the lever 53.

If the screw 57 is turned so that it moves inwardly the lever 53 will be rocked about its pivot point and the fork 55 will engage the projections 51 and the raise the plate 49. The upper surface of this will come in contact with the cone shaped member 20 and lift the cone and magnet so that the jewel 21 will be lifted clear of its suspension pin 23. At the same time the cone will be brought into contact with the sides of the opening in the cover 19 of the box 18 and can be clamped firmly in position. This is to prevent any accidental injury to the magnet and the quartz pointers when the instrument is being transported or is not in use.

The inner side of the casing has attached thereto an arc shaped shelf 59 upon which is supported a similarly shaped thermometer 60.

The index pointer 22 of one magnet is attached thereto so that it will lie in the magnetic axis of the magnet. The pointer attached to the lower disk is set off at an angle from the magnetic axis of this magnet and this angle may be varied, but is usually chosen as 60°. Whatever the angle between the two pointers may be, it is obvious that there might be two positions separated by the complement of the chosen angle. In order to prevent displacement of the pointer 22 there are attached to the spider arms 14 vertical quartz rods 61 which extend into position to engage the pointers 22 and prevent their swinging beyond a limited range.

When it is desired to use the instrument, the head of the micrometer screw is turned until the two pointers coincide. This is the zero setting and may be read on the micrometer head. Looking through the reading lens the observer sees the pointer of the lower magnet directly and the reflection of the pointer of the upper magnet in the mirror 44. This eliminates parallax, and makes it relatively easy to set the two pointers in coincidence. When the zero setting has been made for any particular location of the instrument, any change in the field is disclosed by an opening or scissoring of the two pointers, and the angular amount of which can be read on the scale 45. The orientation of the instrument may be controlled in connection with a suitable sighting device by means of the scale 5 on the base member 1. The instrument may also be used through orientation on a fixed magnet for the purpose of observing changes in magnetic declination by means of the quartz index 48 mounted on the movable index ring.

Figures 4, 5 and 6 disclose a second embodiment of the invention which operates on the same principle as does the first. In this construction a ring 62 is provided with ears 63 by means of which it may be supported inside a casing (not shown) for slight oscillatory movement. At right angles to the ear 63 the ring has cut-outs 64 in which rest ears 65 on sleeves 66 integral with a ring 67. These ears are held in position by a cover plate 68 at the top and a similar cover plate 69 at the side. This form of suspension has been found very useful for observations on sea.

A spider having four arms 70 and a central web 71 (Fig. 6) is supported by the ring 67. By means of appropriate clips 72 there is supported on each pair of arms 70 an arc-shaped plane mirror 73.

One sleeve 66 is carried by a guide rod 74 which is supported in a suitable manner in the casing. The other sleeve 66 has a rod 75 passing therethrough, this rod being provided with a right hand screw thread 76 above the sleeve 66 and a left hand screw thread 77 below said sleeve. A sleeve 78 is internally threaded and carried by the right hand threaded portion of the rod 75. This sleeve has a supporting bar 79 rigid or integral therewith which extends to the opposite side and is provided with a forked end 80 which slidably engages the guide rod 74. A lower sleeve 81 is internally threaded and mounted on the left hand threaded portion of the rod 75 and this is provided with a supporting bar 82 which extends to the opposite side and has a forked end 83 engaging the guide rod 74. Since this mounting prevents any rotative movement of the bars 79 and 82 or the sleeves connected therewith, it is obvious that if the rod 75 is rotated the bars 79 and 82 will be moved toward or from each other according to the direction of rotation of the rod 75. This mechanism is employed for moving the magnets toward or from each other as desired. The rod 75 is rotated by micrometer screw mechanism similar to that herein described in connection with a subsequent form of the mechanism. The bars 79 and 82 support the two magnets, together with another mechanism, which will now be described.

Near the middle of the bar 79 is supported the magnet 84 which is substantially the same as that described in connection with the first form of the invention and has a central cone shaped member 85 carrying a jewel in its end which is supported on the pin 86. It is provided with a quartz pointer or indicator 87. The displacement of the magnet is prevented by an arch-shaped metal strip 88 which is fast at its ends to the bar 79 and extends over the upper portion of the cone shaped member and the indicator without contacting therewith.

The lower magnet 84 is supported on the bar 82 in exactly similar manner and needs no further description.

Two members 89 and 90 have their parallel middle portions supported on the bar 79 at opposite sides of the center thereof and each end of these members have diverging portions. The end portions of these members support scales 91 having gradations 92 on the inner vertical face thereof. Inside of the scales and supported by the members 89 and 90 are two mirrors 93 having outer reflecting surfaces 94 arranged at an angle of 45° and facing the gradations of the scales 91. The arrangement of the quartz indicators carried by the magnets, the mirrors 73, the scales 91, and the mirrors 93, is such that when the instrument is supported in position an observer looking directly downward will see the reflection of the upper pointer 87 in the mirror 73, will see the lower pointer directly, and will read the gradations of the scale 91 on the mirror 73 since these have been reflected by the angular mirror 93 downward upon the mirror 73. This arrangement will entirely eliminate parallax, since the lines of sight are all of equal length.

For preventing the magnets from taking up an erroneous position, there are provided as in the first form, quartz bumpers. The upper bumpers 95 are four in number and carried by the members 89 and 90. The lower bumpers 96 are also four in number and are constituted by the upturned ends of two members mounted upon the lower bar 82. The mechanism thus described is employed in the same manner as the first form of the device and needs no further explanation. It is intended to be supported in a casing closed by a reading lens and instead of the electromagnetic damping employed in the first form, liquid damping is employed. The entire casing containing the instrument is filled with a suitable liquid. This liquid must have certain properties such as transparency, permanency, inertness and mobility at ordinary temperatures. It should also be as heavy as possible. Gasoline has usually been employed but experiments made with acetylene tetrabromide appear to show that this liquid may be very satisfactory. The damping liquid will also act to a certain extent as a lubricant for the various pivoted bearings, particularly those of the magnets.

A third form of the invention is disclosed in Figures 7 to 11 inclusive. In this construction a base 97 is supported on feet 98 which may be adjustable if desired, for leveling purposes. Two shafts or rods 99 and 100 extend upwardly from the base and support a top plate 101. The shaft 100 may be fixed in both top and bottom plates but the shaft 99 is mounted for rotation but prevented from endwise movement in the top and bottom plates. A carriage 102 has a guide sleeve 103 through which passes the rod 100 and has a split sleeve 104 which is internally threaded to engage left hand threads 105 on the rod 99. A similar carriage 106 has a sleeve 107 through which the rod 100 passes and a split sleeve 108 which is internally threaded to engage right hand threads on the rod 99. These carriages 102 and 106 support cells 109 and 110 by means of screws 111 which screw into the carriage base and have eccentric heads overlying flanges on the cells. Each cell has a reference mark as indicated at B which is to be placed in registry with a corresponding mark on the carriage in order that the cell may be properly positioned.

The shaft 99 may be turned by means of a finger wheel 112 at the upper end thereof and the degree of turning movement may be registered by means of the micrometer mechanism 113 of any desired type. This construction is the same or similar to that employed for turning the shaft 76 in the modification shown in Figures 4, 5 and 6. It is obvious that by turning the finger wheel 112 the shaft 99 will be rotated and the sleeves 104 and 108 will be caused to travel either toward or from each other in equal degree, due to the right and left hand threads on the shaft 99. The distance between the two cells which contain the magnets can therefore be adjusted as desired and with great accuracy.

Attached to and depending from the top plate 101 are four similar brackets and two brackets 114 carry smooth guide rods 115. The other two brackets 116 support threaded guide rods 117. The beveled gear 118 is fast on the shaft 99 and meshes with beveled gears 119 and 120 which are fast on the two shafts 117.

Two lenses 121 are carried by frames 122 each of which has a smooth sleeve 123 through which passes the corresponding rod 115 and also an internally threaded split sleeve 124 which meshes with the screw threads on the shafts 117. It will be obvious from this construction that as the finger piece 112 is turned to rotate the shaft 99 and adjust the magnet carrying cells toward or from each other, that at the same time the beveled gears 119 and 120 will be rotated and the turning of the shafts 117 will cause the lens carrying frames to move toward or from each other in a similar manner. In this manner there is always preserved the proper relation between the magnets and the lenses which form a part of the optical system.

The transverse bar 125 (see Figure 9) is supported against movement on the shafts 99 and 100 and has fixed thereto two right angular speculum prisms 126 and 127 or similar reflectors.

In this embodiment of the invention liquid damping is employed as in the second form above described, but instead of placing the entire apparatus in a casing filled with liquid each magnet is placed in a similar cell which is closed and filled with the damping liquid. Two constructions of cells are illustrated which are similar in most respects but different in minor details. One form 127 is illustrated in Figure 10 and the other form 128 is shown in Figure 11. The points in which the two cells are identical will first be described.

Each cell has a base 129 supporting the short glass or other transparent cylinder 130 upon which rests a top 131. The base has a central circular opening 132 which is closed by a glass or other transparent member 133 held in position by a ring 134 threaded in the said base. The top has a similar central opening 135 closed by a glass or other transparent member 136 held in position by a ring 137 threaded into said top. The top and base members are held together by a plurality of rods or similar fastening devices.

In order to provide for expansion of the damping liquid during temperature changes, the top member is provided with a plurality of cavities 139 which are closed at the top but communicate with the interior of the cell by small openings. This permits the liquid to pass from the central portion of the cell to these cavities as it expands, but the openings are so small that no splashing movement can be set up within the cell.

In the form shown in Figure 10 a bridged piece 140 and an arched member 141 supported by the base are each provided with jewelled bearings with which engage two ends of a spindle 142 which supports the magnet 143. This gives a two point support for the magnet. In this modification also is illustrated the use of a wire gauze 144 inside of the glass cylinder to protect against possible electrical disturbances occasioned by the action of the wind on the exposed glass surfaces. Although illustrated only in connection with the cell in Figure 10, it is obvious that this may be used with the other form of cell.

The magnet support in Figure 11 is of the single bearing type such as that shown in the first and second forms of the invention above described. The base supports a pivot member 146, the pointed end of which engages with a jewel bearing in the upper end of a cone 147 which supports the magnet 148. An arch member 149 carried by the base prevents displacement of this cone but is normally out of contact therewith.

As illustrated in Figure 9 there are provided quartz fiber index rods 150 which are mounted just below the magnetized disk to give a fixed reference line. Since as above described, there are two possible equilibrium positions for the same vertical distance between the magnets, there are provided four short quartz fiber bumpers 151 which are mounted symmetrically on perpendicular diameters in the disk magnets. These are just long enough to touch the quartz fibre index rods 150 and therefore restrict the departure of magnet systems from equilibrium to an angle of 45° on either side in such position.

Each magnet is provided with an index scale thereon, this being placed on the under side of the upper magnet and on the top side of the lower magnet. An observer at the point A of Figure 9 looking through the lens 121 will by means of the mirror 126 read the scales of both the upper and lower magnets and can therefore determine the angle existing between the same. The two lenses 121 are provided to permit of simultaneous observation by two observers or in order that one lens may be used when the instrument is located in a more appropriate position than it is for use of the other lens. The method of employment of this form of the device is substantially the same as that of the previous forms and need not be described in detail. It may be noted only that for use on board ship it has been found quite desirable to mount this form in an inertia gimbal system in order to differentiate the regular oscillations of the magnet from those caused by passing over a small area of local disturbances.

It is obvious that the invention may be embodied in other forms without in any way departing from the fundamental principle underlying the same and also that the precise construction illustrated may be departed therefrom in details without in any way departing from the spirit of the invention. It is therefore understood that the invention is to be regarded as limited only by the scope of the appended claims.

We claim:

1. A compass-variometer comprising two magnets mounted for free independent rotation in a horizontal plane and having their magnetic axes arranged at a selected angle to each other, means for moving said magnets simultaneously and through equal distances toward or from each other, an optical system arranged to eliminate parallax for reading the amount of relative movement between said magnets in a horizontal plane, and means for adjusting an element of said optical system simultaneously with the adjustment of said magnets.

2. A compass-variometer comprising two direction-seeking magnets supported one above the other and mounted for free independent rotation in a horizontal plane, means for limiting the amount of said rotation, means for moving said magnets toward or from each other, and means for determining the movement of said magnets in said horizontal plane.

3. A compass variometer comprising two direction-seeking magnets supported one above the other and mounted for free independent rotation in a horizontal plane, means for limiting the amount of such rotation, and means for reading the amount of rotation.

4. A compass variometer comprising two magnets supported one above the other for free independent rotation in a horizontal plane, means for limiting the amount of such rotation, and means including an optical system for reading the amount of rotation and for eliminating parallax.

5. A compass-variometer for direct readings with a selected deflection angle, comprising two magnets supported one above another and having their magnetic axes arranged at a selected angle, means for varying at will the vertical distance between said magnets to maintain said angle constant for different intensities of magnetic field, said means having a scale indicating directly the intensity of the magnetic field.

6. A compass-variometer for direct reading with a selected deflection angle, comprising two disk magnets of equal magnetic moment supported one above another and having their magnetic axes arranged at a selected angle in a magnetic field, and means for moving said magnets simultaneously toward and from each other to maintain said selected angle in a field of different intensity, and means cooperating with said moving means for indicating the intensity of the magnetic field.

7. A compass-variometer comprising two disk magnets supported one above another in separate containers, liquid damping means in each container and means for varying at will the distance between said magnets.

8. A compass-variometer comprising two disk magnets supported one above another with their pivots in vertical alignment, said magnets having their axes arranged at a selected horizontal deflection angle, an optical system arranged to eliminate parallax for reading the amount of relative angular movement between the axes of said magnets in a horizontal plane, an element of said system being located mid-way between said magnets and means for varying at will, equally and simultaneously the distance between said magnets and said element.

9. A compass-variometer comprising two magnets pivotally supported one above another with their pivots in vertical alignment and free to rotate in a horizontal plane, said magnets having their magnetic axes arranged at a selected angle, a pointer carried by one magnet and indicating its magnetic axis, a pointer carried by the other magnet and arranged at the selected angle with respect to its magnetic axis, so that the pointers when viewed from above appear in vertical alignment, and scale means by means of which the angular relation of the pointers may be observed when the intensity of the magnetic field is increased or decreased, said scale means reading directly in terms of the intensity of the magnetic field.

10. A compass-variometer for direct readings with a selected deflection angle, comprising two magnets supported one above another on the same vertical axis for free horizontal rotation, means for indicating the angular relation of the magnetic axes of said magnets and arranged at a selected angle with respect to each other, an optical system for observing the angular relation of said means, an element of said system being located mid-way between said magnets, and means for varying at will, equally and simultaneously the distance between each magnet and said element to maintain said selected angle, said last named means having indicating means indicating directly the intensity of the magnetic field.

In testimony whereof, we have hereunto subscribed our names.

LOUIS A. BAUER.
WILLIAM J. PETERS.
JOHN A. FLEMING.